United States Patent [19]

Sugino

[11] Patent Number: 5,478,613
[45] Date of Patent: Dec. 26, 1995

[54] PRESSED FLOWER ORNAMENT

[76] Inventor: Nobuo Sugino, 701. Sakura-Pier Higashi-Kanagawa, 1-6-1 Nishi-Kanagawa, Kanagawa-ku, Yokohama-shi, Kanagawa-ken, Japan

[21] Appl. No.: 152,646

[22] Filed: Nov. 12, 1993

[51] Int. Cl.[6] .................................................. A01N 3/00
[52] U.S. Cl. ................................ 428/13; 428/22; 428/24
[58] Field of Search .............................. 428/24, 13, 17, 428/22; 427/4; 156/57

[56] References Cited

U.S. PATENT DOCUMENTS

| 472,980 | 4/1892 | Brown | 428/24 X |
| 4,885,037 | 12/1989 | Ohkubo | 428/24 X |

*Primary Examiner*—Henry F. Epstein
*Attorney, Agent, or Firm*—Jordan and Hamburg

[57] ABSTRACT

A pressed flower assortment is airtightly sealed in between a transparent plate and a base board so that it remains intact for long without changing or fading its colors. It will be mounted in a frame for display.

10 Claims, 13 Drawing Sheets

PRESSED FLOWER ORNAMENT

BACKGROUND OF THE INVENTION

The present invention relates to a pressed flower ornament containing a pressed flower(s) and capable of being mounted in a frame for display.

A traditional pressed flower ornament is fabricated by setting a pressed flower assortment on a base board with an adhesive or pieces of string and if desired, enclosing it in a transparent bag made of e.g. polyethylene.

However, if the pressed flower assortment is not protected with a bag or cover, it will quickly change or fade in colors and be stained with dust.

Also, the pressed flower assortment has to be protected in an appropriately sized transparent bag. Otherwise, its appearance will be impaired by gaps and wrinkles on the transparent bag. If the airtightness in the transparent bag is poor, the pressed flower assortment will gradually be deteriorated and faded with time.

SUMMARY OF THE INVENTION

It is an object of the present invention, in view of the foregoing aspects, to provide an improved pressed flower ornament which has a pressed flower assortment airtightly sealed in between a transparent plate and a damp-proof base board so that the pressed flower assortment remains intact for a long time without changing or fading of its colors. Also, the pressed flower ornament of the present invention can be mounted in a frame for display.

The above and other objects and features of the present invention will fully be apparent from reading the following description in conjunction with the relevant drawings.

The drawings are illustrative and not intended to limit the scope of the present invention.

BRIEF DESCRIPTION OF THE PRESENT DRAWINGS

DESCRIPTION OF THE PREFERRED EMBODIMENTS

Figure 1:
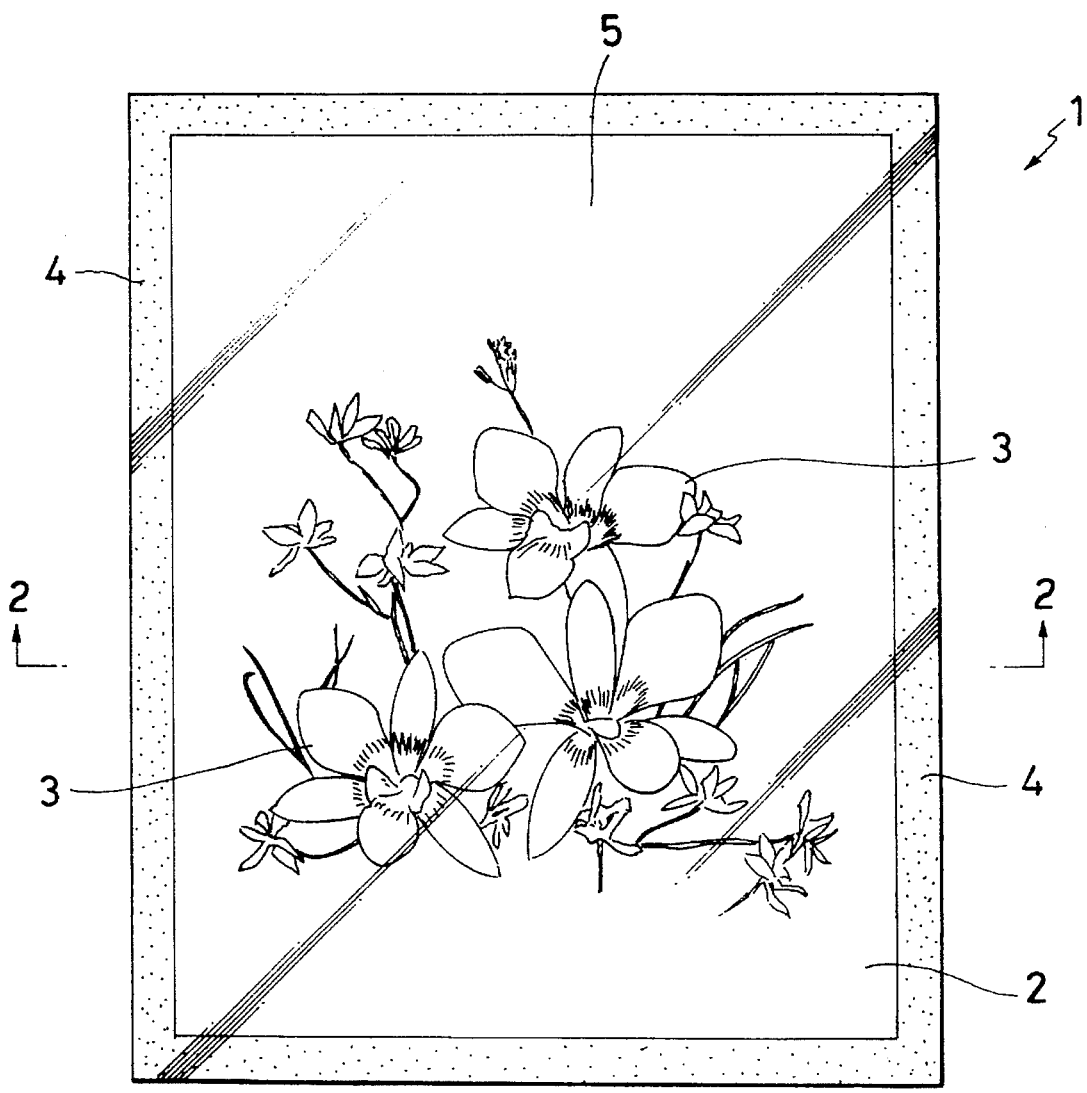
FIG. 1 is a plan view of a pressed flower ornament showing a first embodiment of the present invention.
Figure 2:
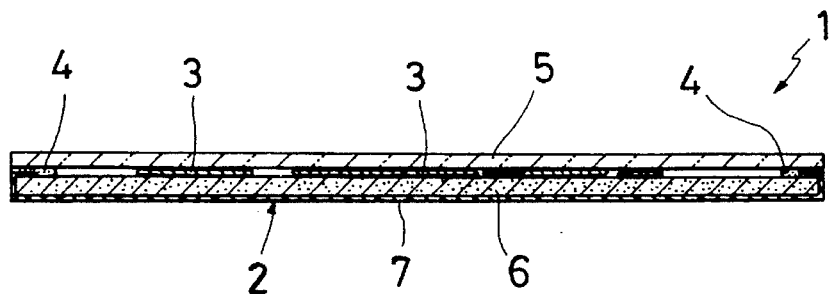
FIG. 2 is a cross sectional view taken along the line 2—2 of FIG. 1.

Preferred embodiments of the present invention will be described with reference to the accompanying drawings.

FIGS. 1 to 5 illustrate a first embodiment of the present invention in which a pressed flower ornament 1 comprises a base board 2 made of a damp-proof material, a pressed flower assortment 3 disposed on the front surface of the base board 2, and a transparent plate 5 closely coupled to the base board 2 by an adhesive tape or adhesive agent 4 of the non-solution type applied throughout the hem of the base board 2 so that the pressed flower assortment 3 is airtightly sealed in between the transparent plate 5 and the base board 2.

Figure 3:
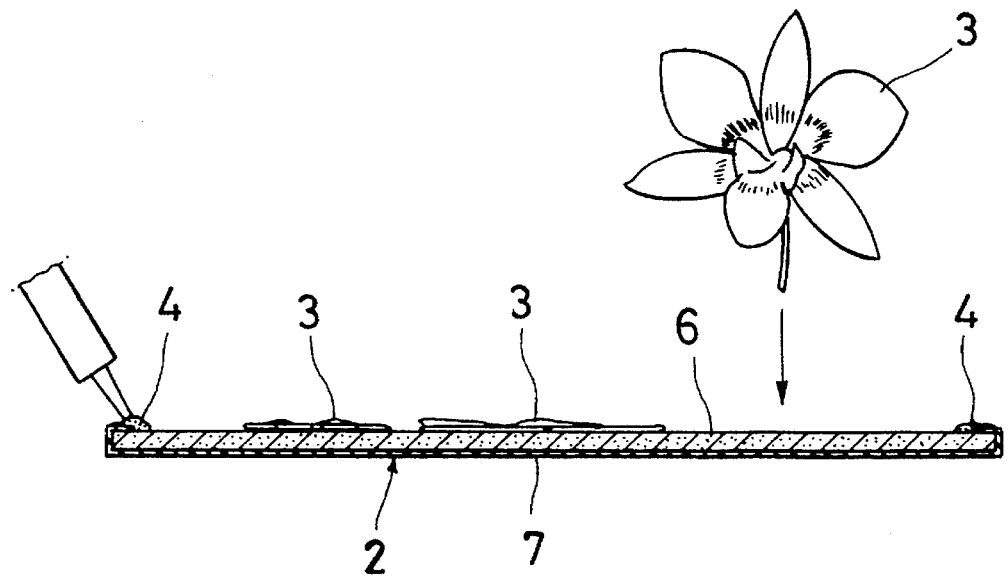
FIG. 3 is an explanatory view showing the application of an adhesive agent to a base board provided at top with a pressed flower assortment of the pressed flower ornament.

As best shown in FIG. 3, the base board 2 comprises a base body 6 made of a paper board coated or saturated with a desiccant, e.g. calcium chloride or lithium chloride, and a damp-proof sheet 7 of e.g. polypropylene or KOP material bonded to the base body 6 so that it can cover the entire back surface and a hem portion of the front surface of the base body 6.

The transparent plate 5 may be selected from transparent glass, acrylic, polyester, and polycarbonate plates.

Figure 4:
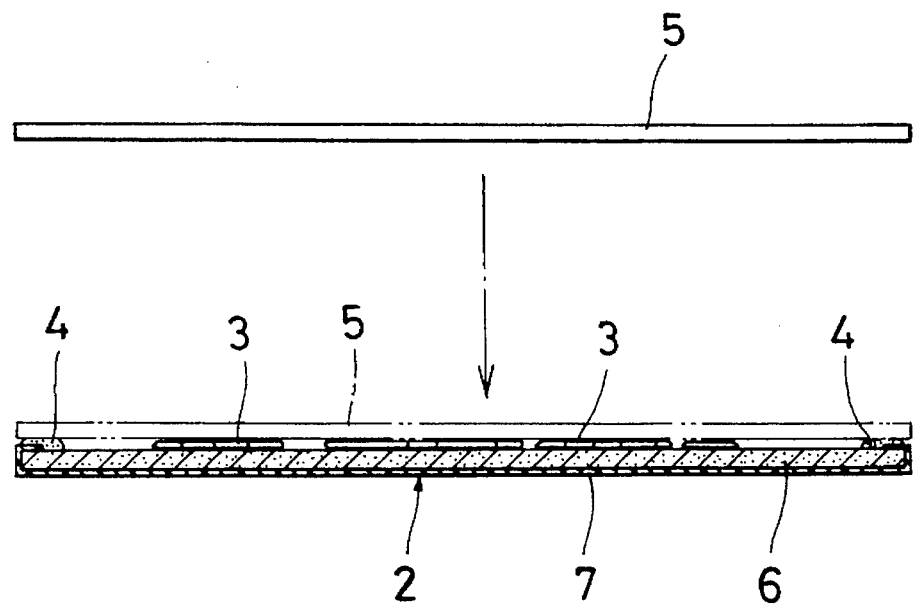
FIG. 4 is an explanatory view showing the coupling of the base board to a transparent plate.

The pressed flower ornament 1 can be assembled starting with, as shown in FIG. 3, setting the pressed flower assortment in place on the front surface of the base board 2 and applying the adhesive agent 4 of non-solution type to the hem of the base board 2. Then, the transparent plate 5 is placed to cover the front surface of the base board 2 and bonded to the base board 2, as shown in FIG. 4.

As a result, the pressed flower assortment 3 is sandwiched between the transparent plate 5 and the base board 2 is airtightly retained as being constantly dried with the desiccant of the base board 2.

Figure 5:
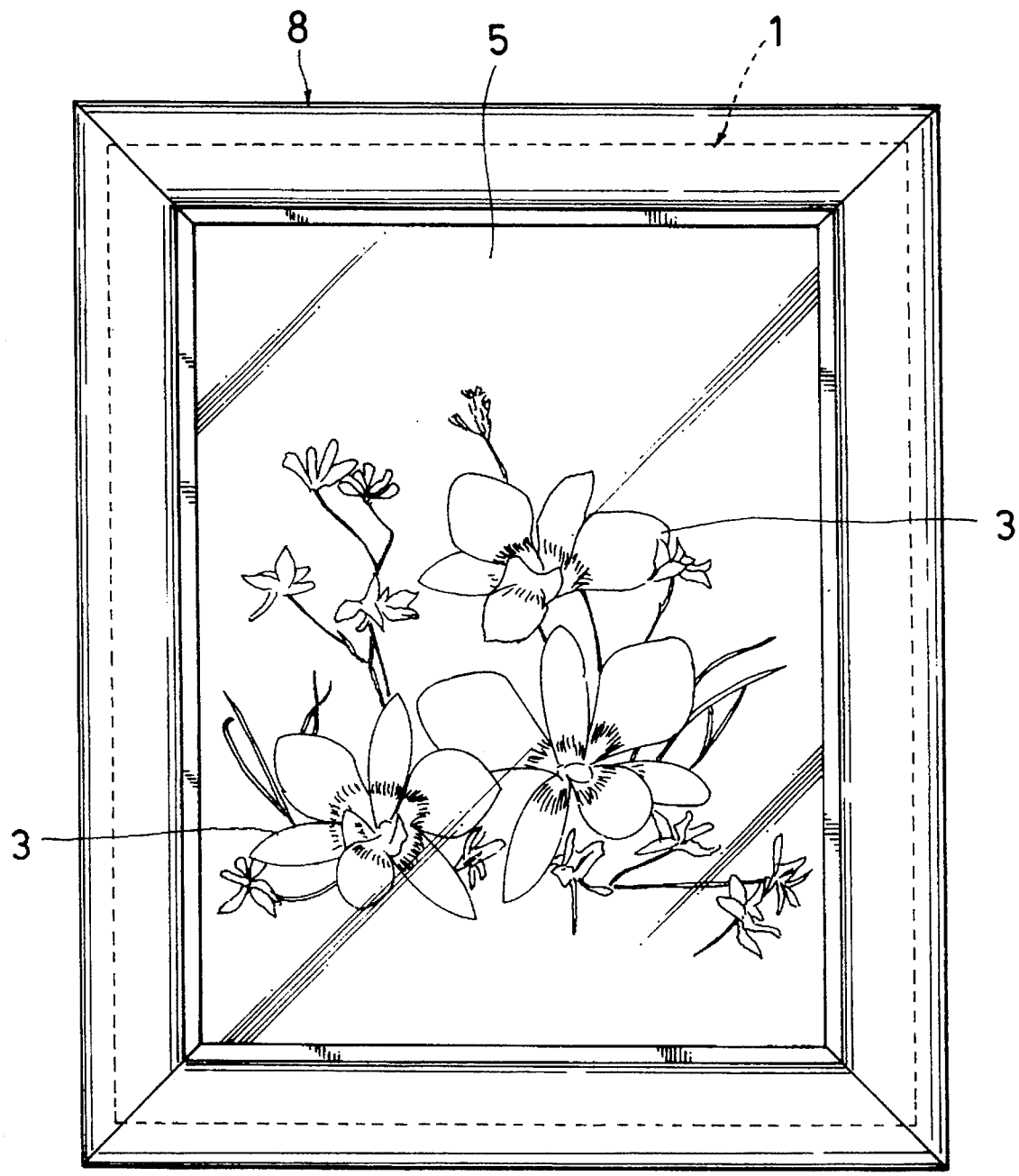
FIG. 5 is an explanatory view showing the pressed flower ornament of the first embodiment mounted in a frame.

Accordingly, the pressed flower ornament 1 can be mounted in a frame 8 with no glass for display on the wall, as shown in FIG. 5.

Other embodiments of the present invention shown in FIGS. 6 to 21 will now be described. Throughout the drawings, like components are denoted by like numerals as those of the first embodiment and will no more be explained.

Figure 6:
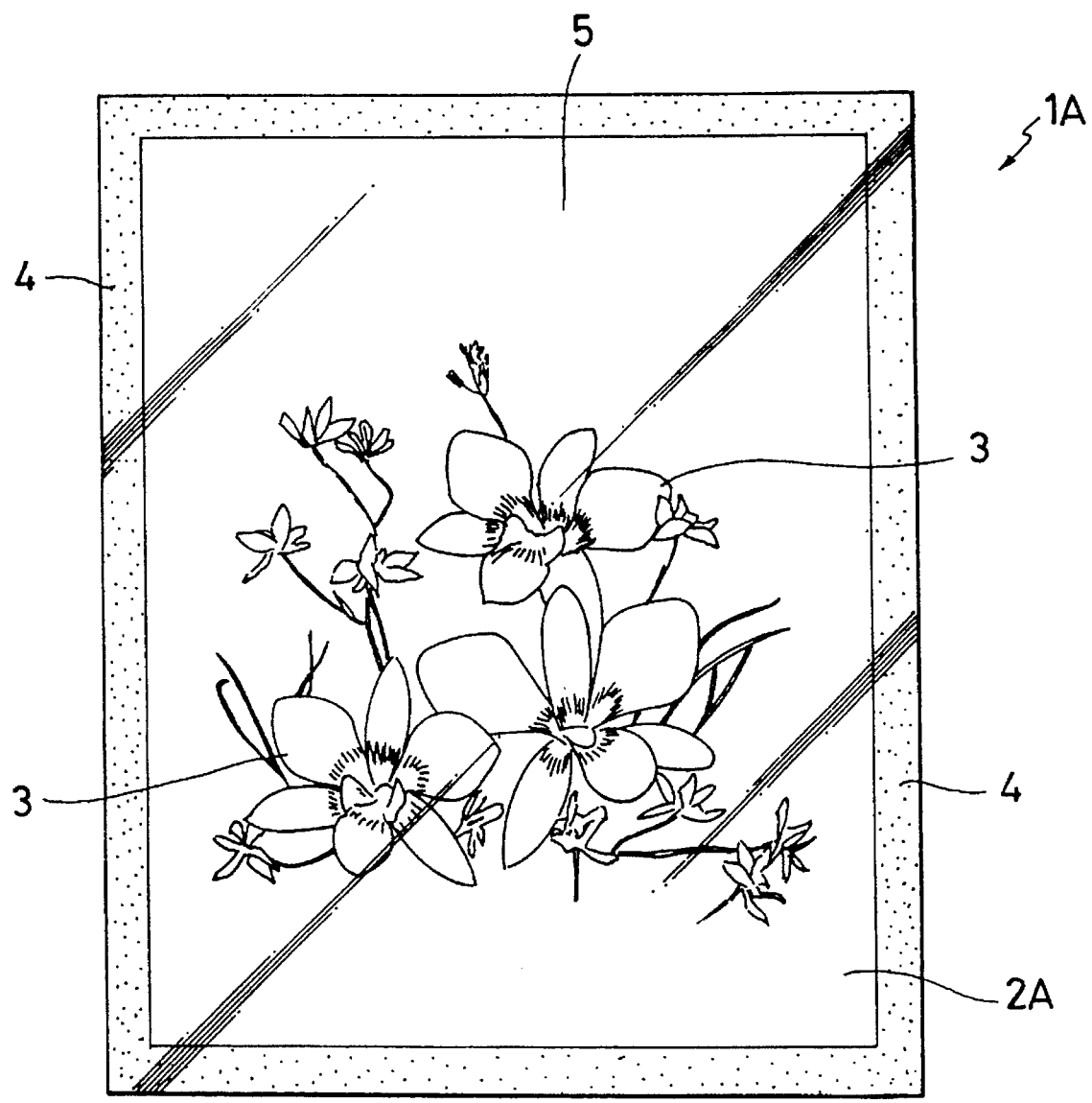
FIGS. 6 and 7 are explanatory views showing a second embodiment of the present invention.
Figure 7:
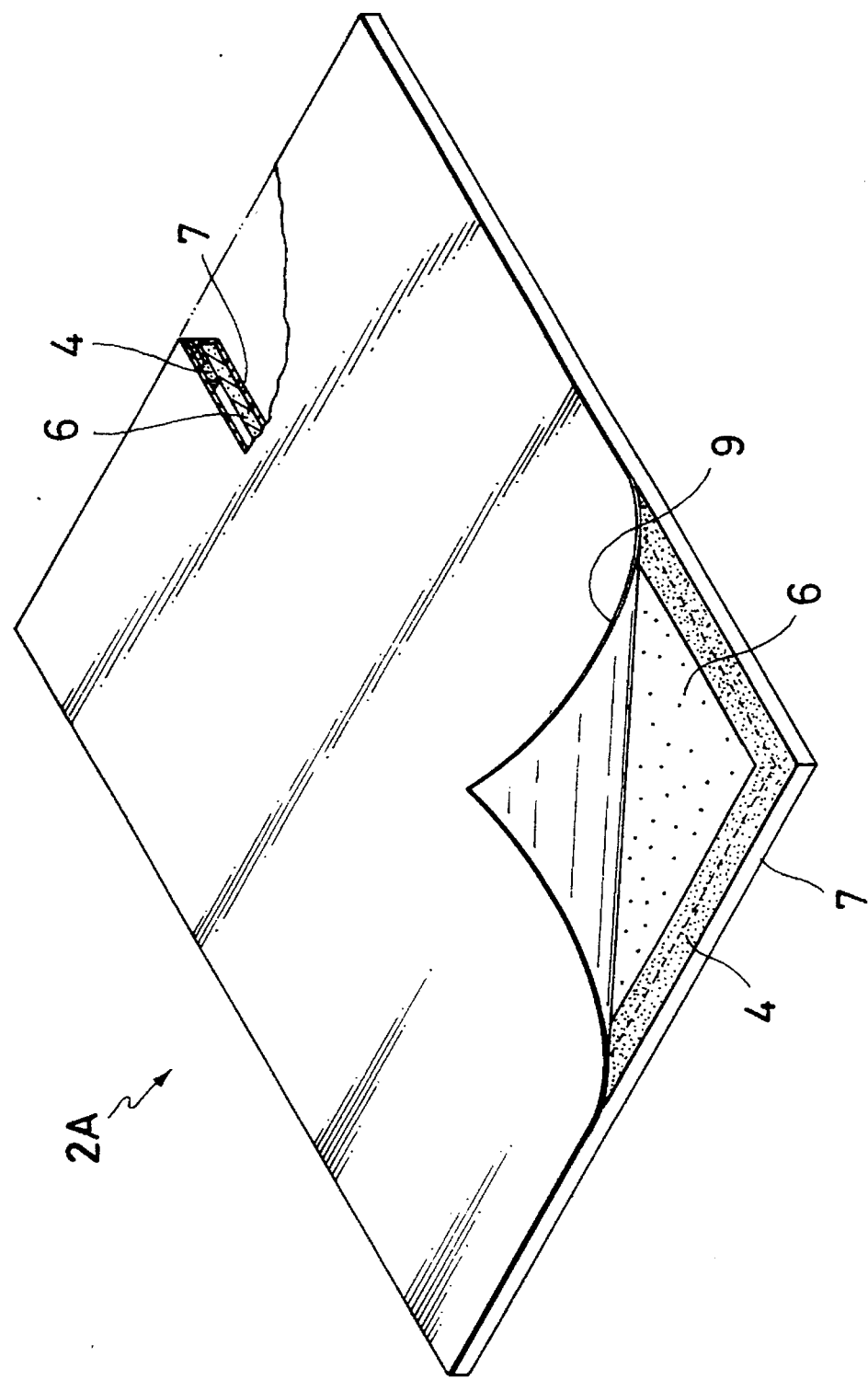

FIGS. 6 and 7 illustrate a second embodiment which is differed from the first embodiment by the fact that the base board 2 is replaced with a modified base board 2A. The modified base board 2A comprises a base body 6 coated or saturated with a desiccant and a protective cover sheet 9 bonded to the base body 6 to cover its entire front surface by application of an adhesive agent 4 of non-solution type to the outer edge of the base body 6. Accordingly, a pressed flower ornament 1A of the second embodiment will be characterized in which the protective cover sheet 9 of the base board 2A prevents loss or declination in the dehydrating effect of the desiccant.

Figure 8:
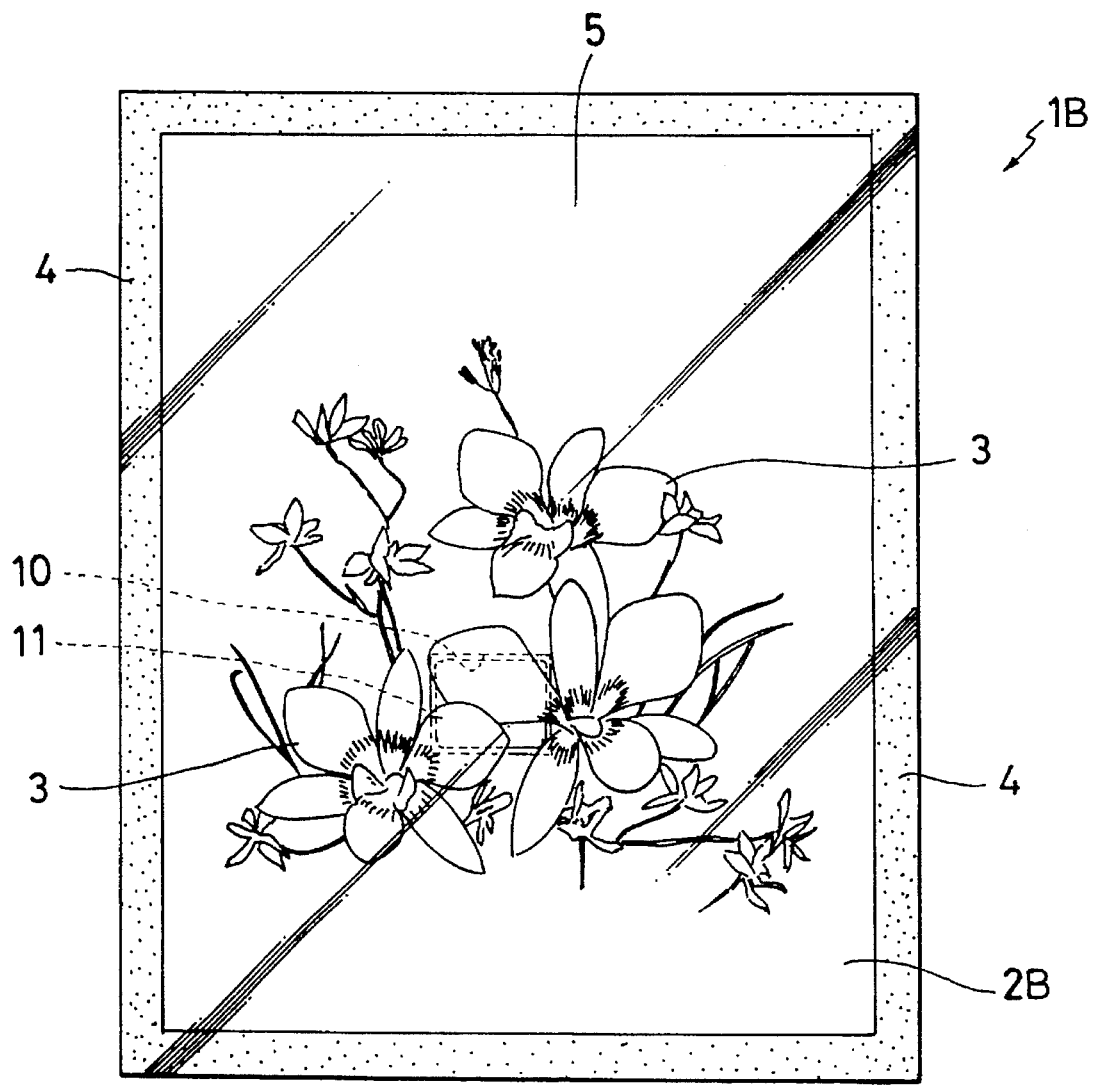
FIGS. 8 and 9 are explanatory views showing a third embodiment of the present invention.
Figure 9:
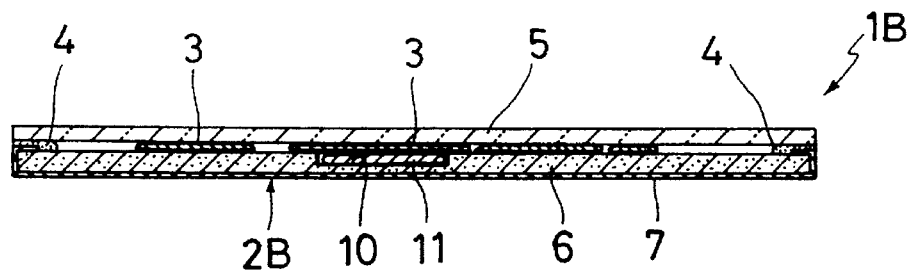

FIGS. 8 and 9 illustrate a third embodiment which is differed from the first embodiment by the fact that the base board 2 is replaced with a modified base board 2B. The modified base board 2B comprises a base body 6 coated or saturated with a desiccant and having a recess 10 arranged in the front surface thereof, and a deoxidant 11 contained in the recess 10. Accordingly, a pressed flower ornament 1B of the third embodiment will be characterized in which the deoxidant 11 of the base board 2B prevents the colors of a pressed flower assortment 3 from fading and changing rapidly with time.

Figure 10:
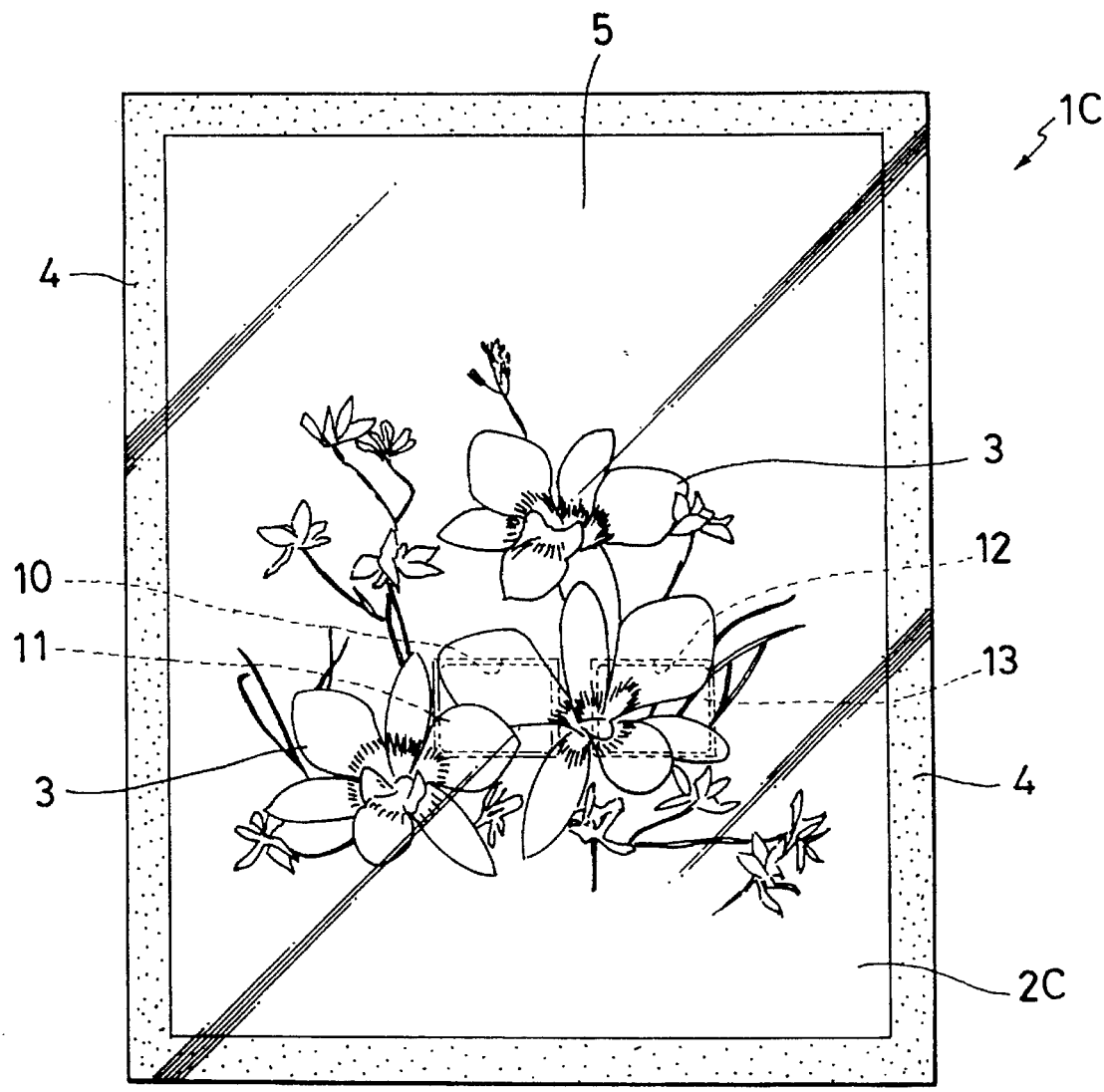
FIGS. 10 and 11 are explanatory views showing a fourth embodiment of the present invention.
Figure 11:
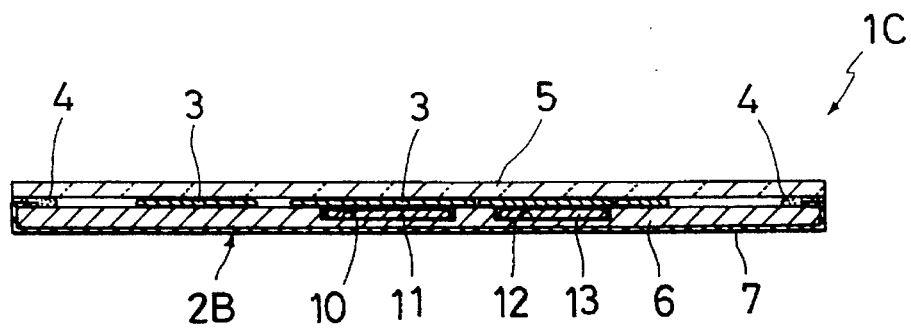

FIGS. 10 and 11 illustrate a fourth embodiment which is differed from the first embodiment by the fact that the base board 2 is replaced with a modified base board 2C. The modified base board 2C comprises a base body 6A not coated nor saturated with a desiccant and having two recesses 10 and 12 arranged in the front surface thereof, and a desiccant 13 and a deoxidant 11 contained in the two recesses 10 and 12 respectively. Accordingly, a pressed flower ornament 1C of the fourth embodiment will provide the effects equal to those of the third embodiment.

Figure 12:
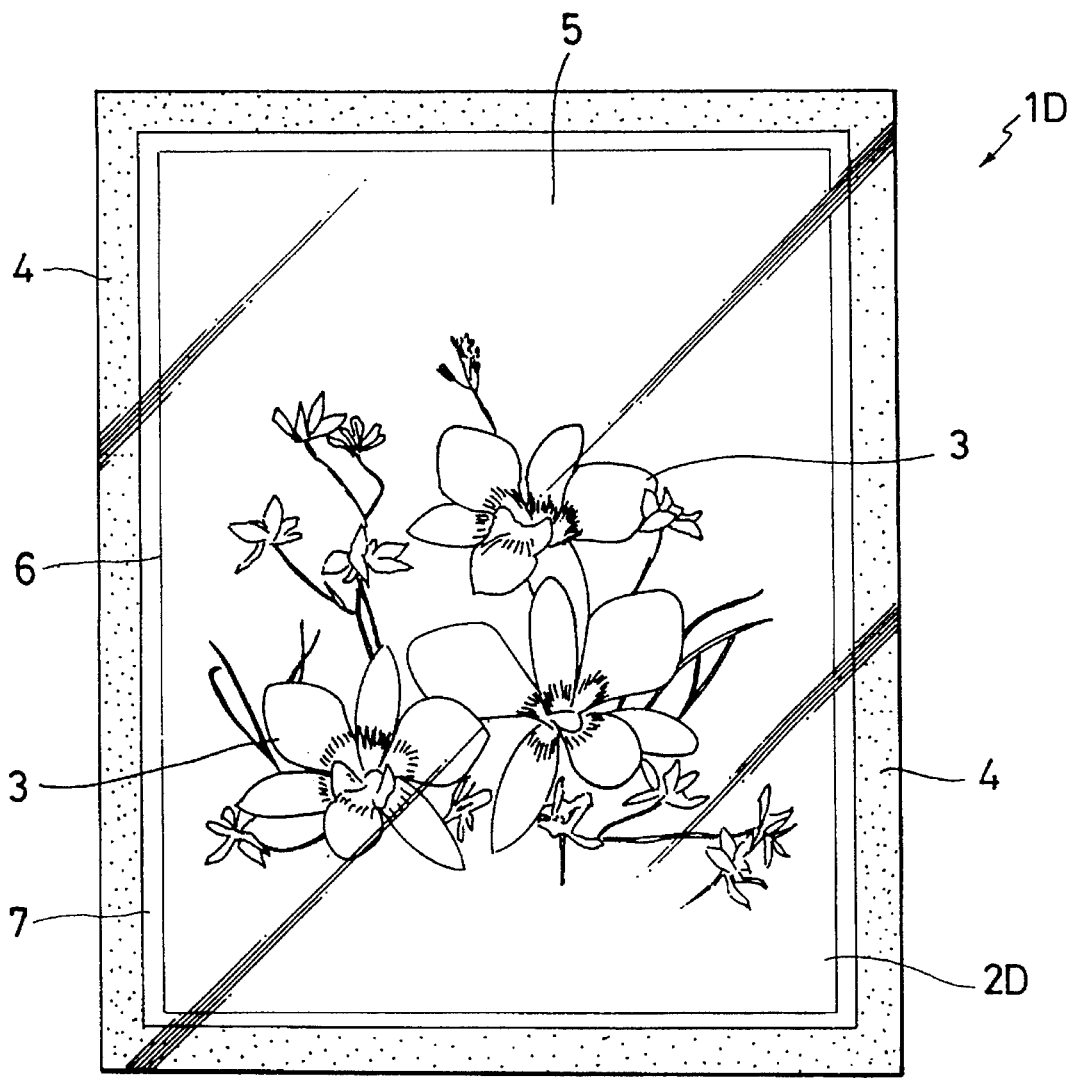
FIGS. 12 and 13 are explanatory views showing a fifth embodiment of the present invention.
Figure 13:
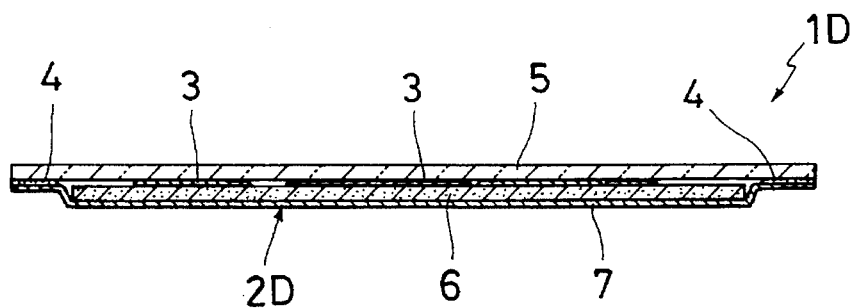

FIGS. 12 and 13 illustrate a fifth embodiment which is differed from the first embodiment by the fact that the base board 2 is replaced with a modified base board 2D. The modified base board 2D comprises a base body 6 coated or saturated with a desiccant and formed to a smaller size than the transparent plate 5, and a damp-proof sheet 7 of an aluminum foil material formed equal in the size to the transparent plate 5 and fixedly or detachably mounted to the back surface of the base body. Accordingly, a pressed flower ornament 1D of the fifth embodiment will provide the effects equal to those of the first embodiment.

Figure 14:
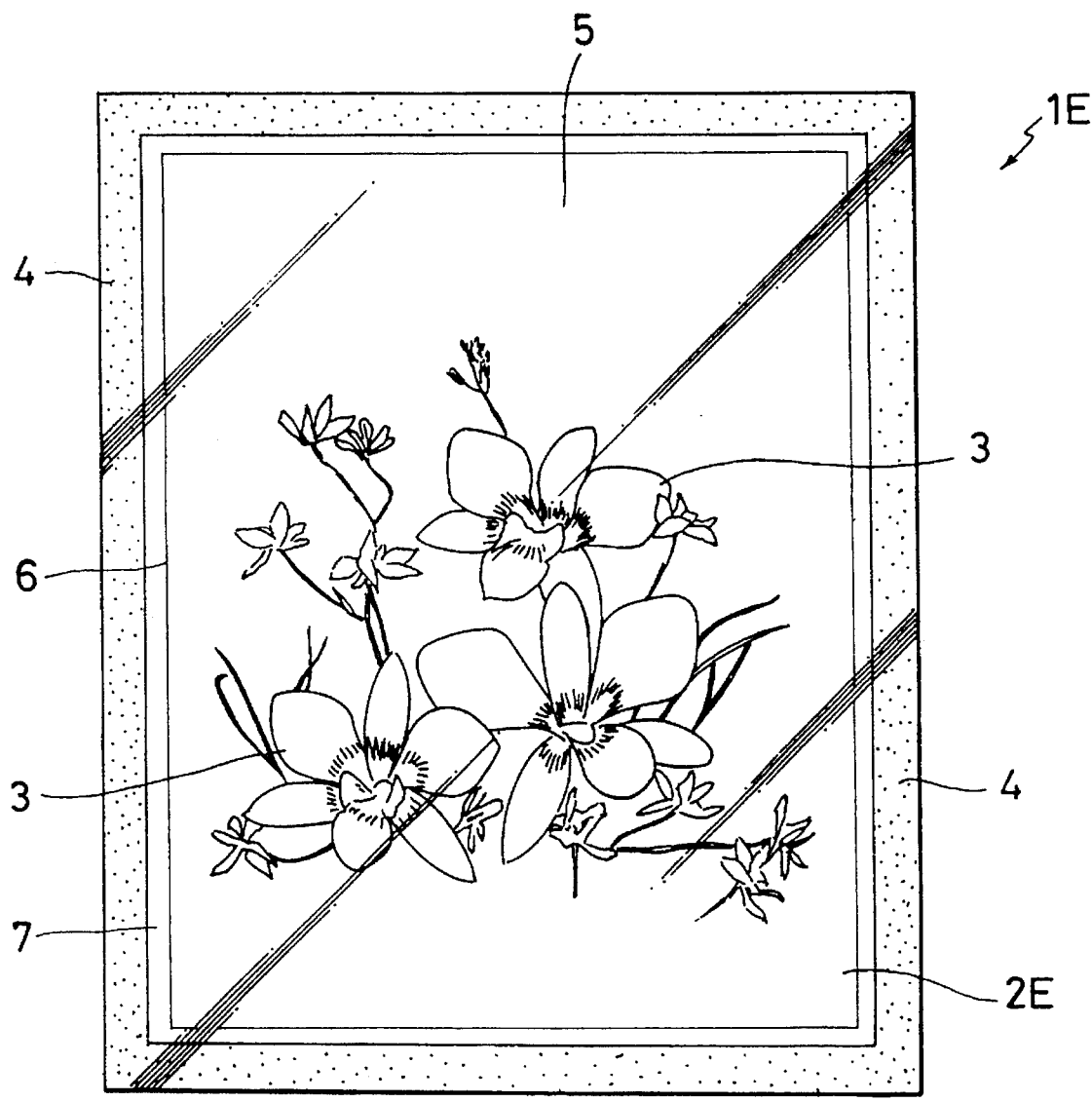
FIGS. 14 and 15 are explanatory views showing a sixth embodiment of the present invention.
Figure 15:
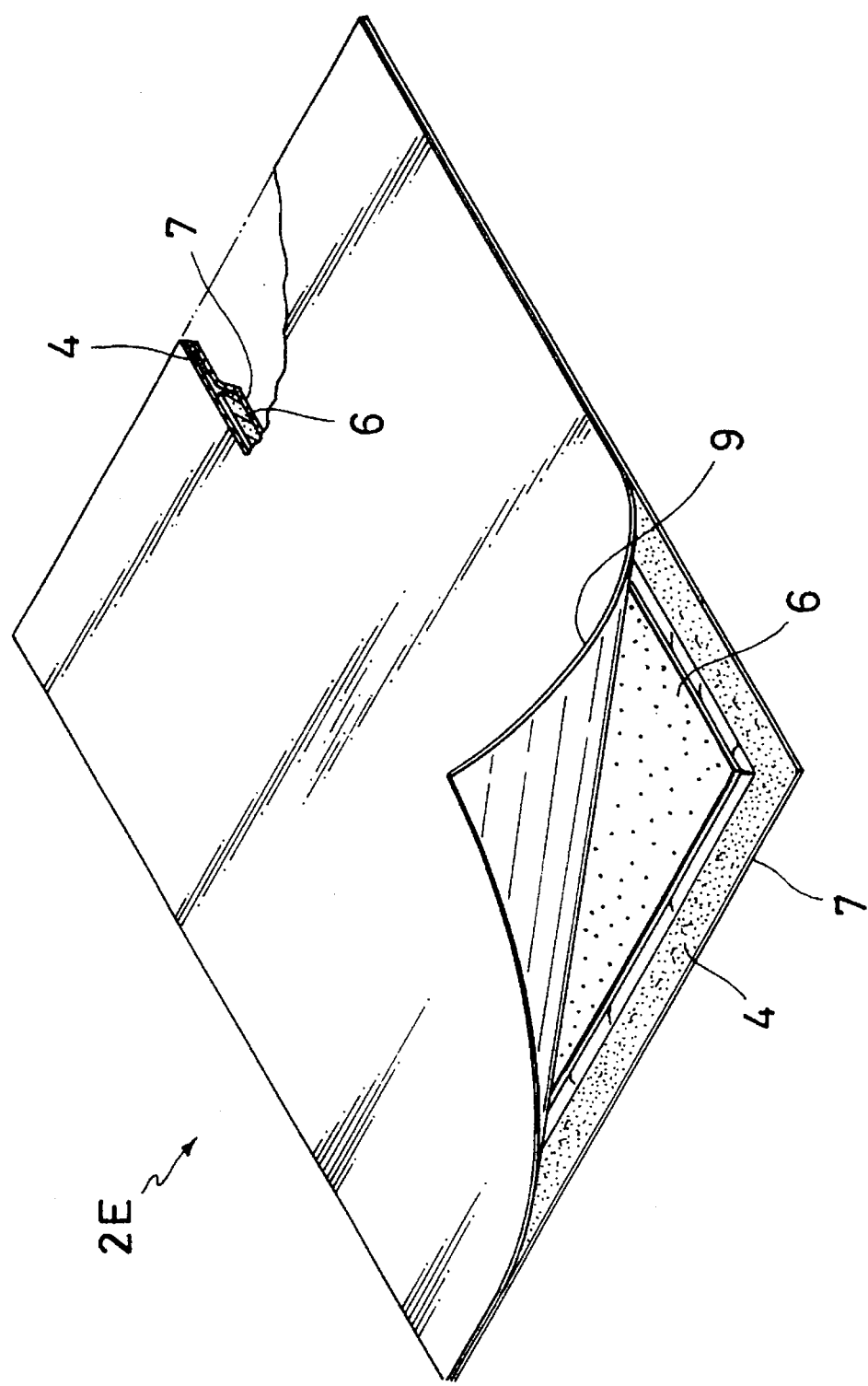

FIGS. 14 and 15 illustrate a sixth embodiment which is differed from the fifth embodiment by the fact that the base board 2D is replaced with a modified base board 2E. In the base board 2E, the base body 6 is fixedly coupled by an adhesive or the like to the damp-proof sheet 7 and covered at front surface with a protective cover sheet 9 which is bonded by the adhesive 4 to a hem portion of the damp-proof sheet 7 extending outwardly of the base body 6. Accordingly, a pressed flower ornament 1E of the sixth embodiment will provide the effects equal to those of the second embodiment.

Figure 16:
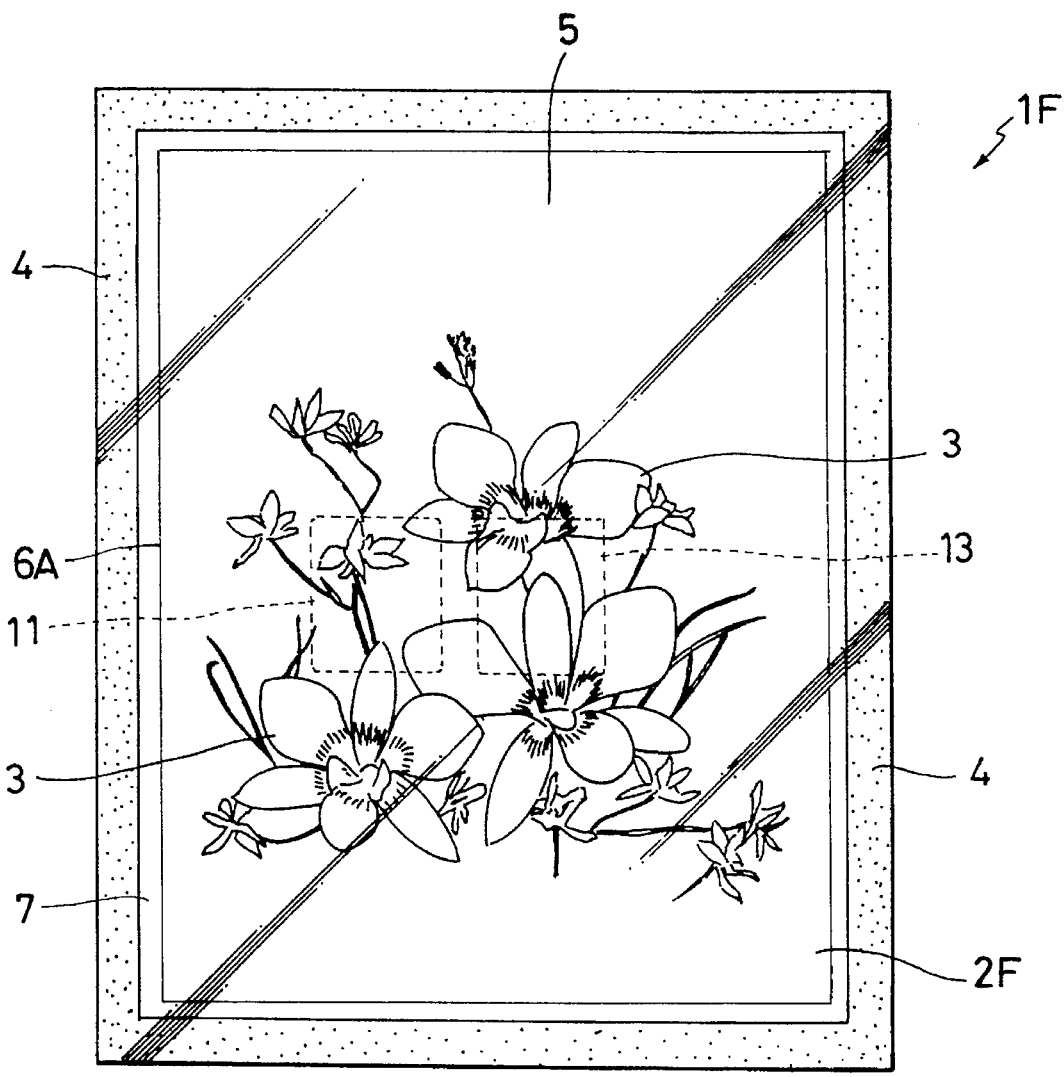
FIGS. 16 and 17 are explanatory views showing a seventh embodiment of the present invention.
Figure 17:
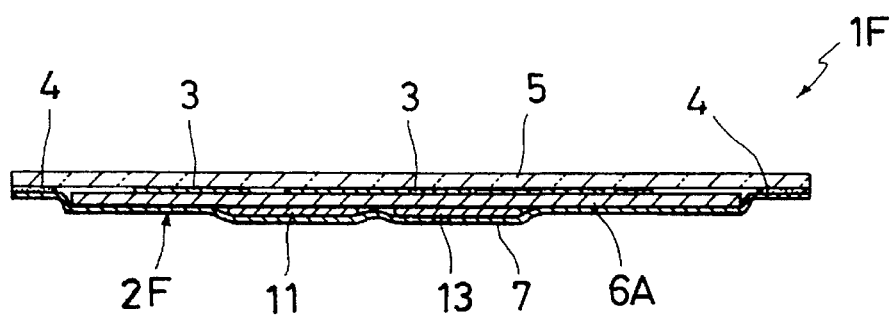

FIGS. 16 and 17 illustrate a seventh embodiment which is differed from the sixth embodiment by the fact that the base body 6 is replaced with a modified base body 6A which is not coated nor saturated with the desiccant. For compensation, a desiccant 13 and if desired, a deoxidant 11 are disposed between the base body 6A and the damp-proof sheet 7, constituting a base board 2F. Accordingly, a pressed flower ornament 1F of the seventh embodiment having the base board 2F will provide the effects equal to those of the sixth embodiment.

Figure 18:
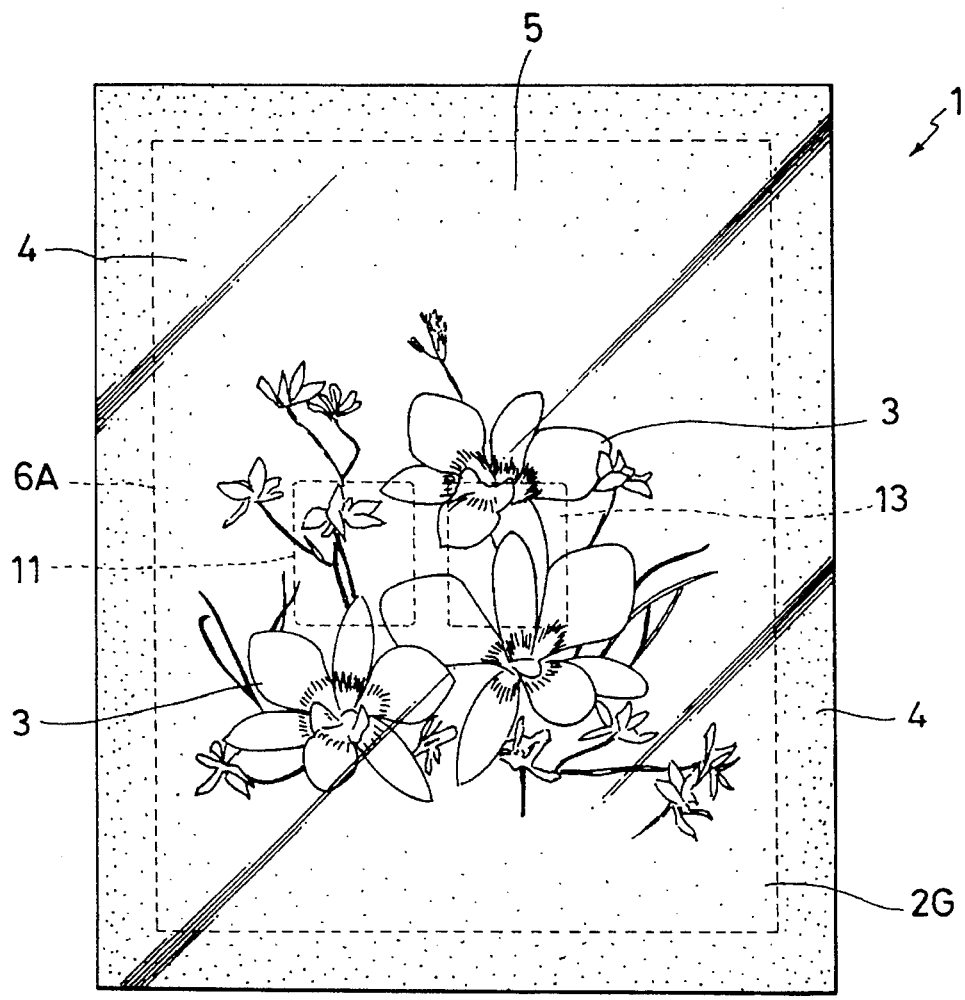
FIGS. 18 and 19 are explanatory views showing an eighth embodiment of the present invention.
Figure 19:
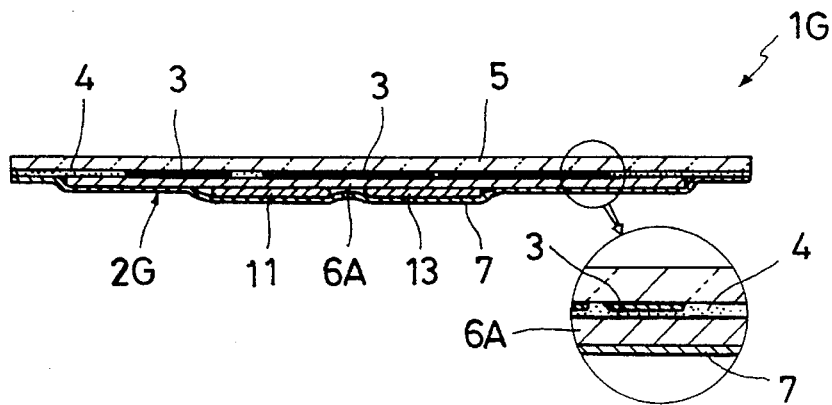

FIGS. 18 and 19 illustrate an eighth embodiment which is differed from the seventh embodiment by the fact that the base board 2F is replaced with a modified base board 2G. In the base board 2G, the base body 6A is completely coated on a front surface with the adhesive agent 4 of non-solution type for ease of setting the pressed flower assortment 3. Accordingly, a pressed flower ornament 1G of the eighth embodiment will provide the effects equal to those of the seventh embodiment.

Figure 20:
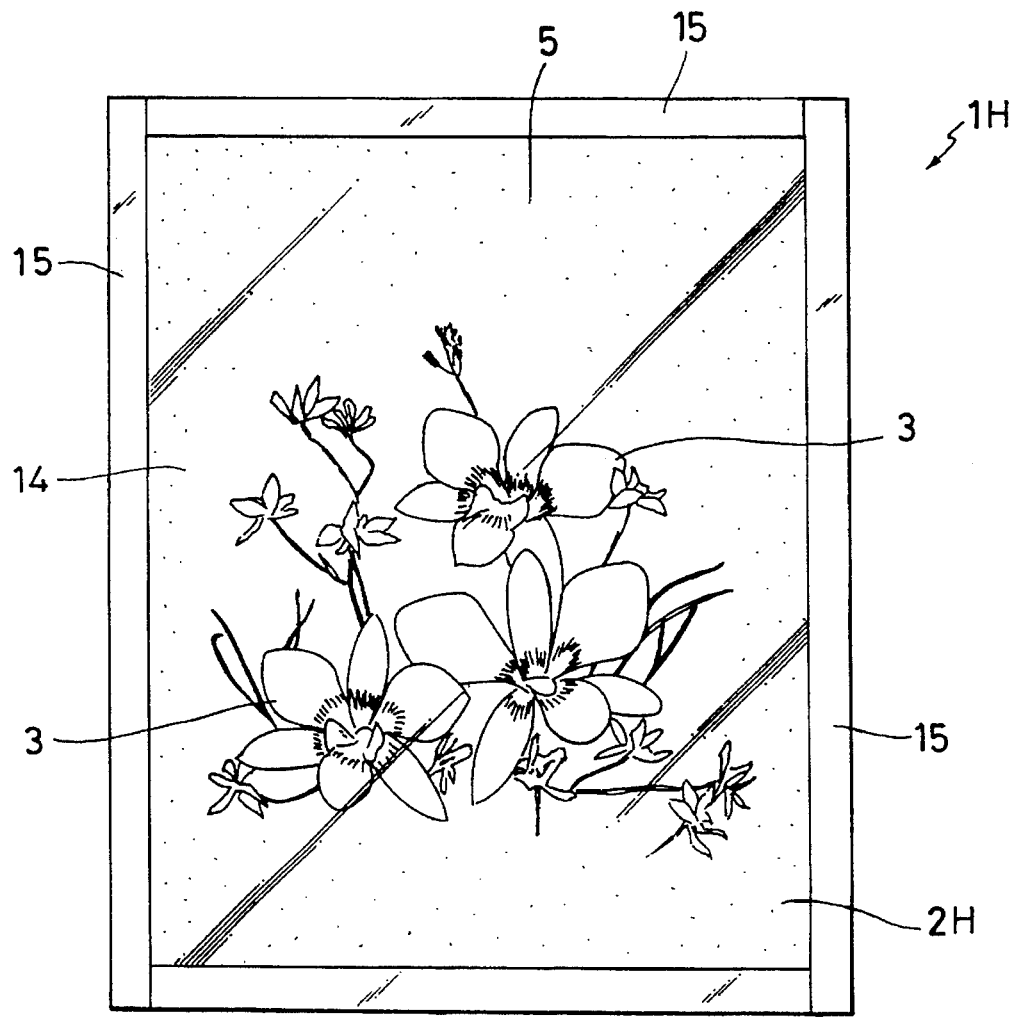
FIGS. 20 and 21 are explanatory views showing a ninth embodiment of the present invention.
Figure 21:
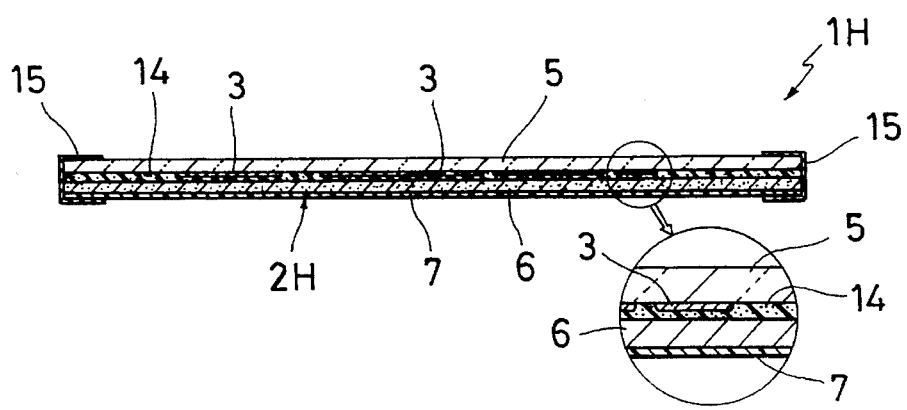

FIGS. 20 and 21 illustrate a ninth embodiment which is differed from the first embodiment by the fact that the base board 2 is replaced with a modified base board 2H. In the base board 2H, the base body 6 is completely covered at front surface with a cushion sheet 14 made of a sponge material or the like. Accordingly, a pressed flower ornament 1H of the eighth embodiment having the base board 2H will provide the effects equal to those of the first embodiment.

The base board 2H may fixedly be coupled to the transparent plate 5 with a length of an adhesive tape 15 made of a damp-proof material extending the entire edge of the base board 2H so that the resistance to moisture for the pressed flower assortment 3 is increased.

As set forth above, the advantages of the present invention are as follows:

(1) The pressed flower ornament comprises a base board made of a damp-proof material, a pressed flower assortment disposed on the front surface of the base board, and a transparent plate coupled to the base board by means of an adhesive tape or adhesive agent extending the entire edge of the base board so that the pressed flower assortment is sealed in between the transparent plate and the base board. More specifically, the pressed flower assortment is air-tightly retained without suffering from dust or dirt while being confined in the dryness created by the desiccant which is coated on or contained in the base board. Hence, the pressed flower assortment will remain intact for a long time without changing or fading its colors.

(2) According to the teaching of paragraph (1), when the pressed flower ornament is placed in a frame with no glass, its pressed flower assortment will remain protected from dust or dirt.

(3) According to the teaching of paragraph (1), the pressed flower assortment is fixedly sealed in between the transparent plate and the base board and will be well preserved. Also, it will be easy to handle the pressed flower ornament for use.

(4) According to the teaching of the paragraph (1), the pressed flower ornament is simple in structure and will be fabricated with ease and less cost.

What is claimed is:

1. A pressed flower ornament comprising:

a dampness-proof base board;

a pressed flower assortment disposed on a front surface of the base board;

the base board having a desiccant incorporated therein;

a transparent plate;

means for adhering applied to an entire peripheral edge of the base board coupling the base board to the transparent plate exclusively along said peripheral edge; and said means, for adhering bridging a distance between said base board and said transparent plate to seal the pressed flower assortment in an air tight condition between the transparent plate and the base board.

2. The pressed flower ornament according to claim 1, wherein the base board further incorporates a deoxidant.

3. The pressed flower ornament according to claim 1, wherein the base board includes a base body having a cushion material forming the front surface of the base board and a dampness-proof sheet bonded to the back surface of the base body.

4. A pressed flower ornament according to claim 1, wherein the base board has at least one recess for holding at least one of a desiccant and a deoxidant.

5. A pressed flower ornament comprising:

a base board including a desiccant;

a dampness-proof sheet having a greater size than the base board and mounted to a back surface of the base board so that an outer edge of the dampness-proof sheet extends outwardly from a peripheral edge of the bass board;

a pressed flower assortment disposed on a front surface of the base board;

a transparent plate;

means for adhering applied to an entire peripheral edge of said dampness-proof sheet extending beyond the base board and coupling the base board to the transparent plate exclusively along a peripheral edge of the dampness-proof sheet; and said means for adhering and said dampness proof sheet bridging a distance between said base board and said transparent plate to seal the pressed flower assortment in an air tight condition between the transparent plate and the base board.

6. A pressed flower ornament according to claim 5, wherein the base board has at least one recess for holding at least one of a desiccant and a deoxidant.

7. The pressed flower ornament according to claim 5, wherein the base board has said desiccant at at least one of the front or back surface.

8. The pressed flower ornament according to claim 5, wherein the base board further includes a deoxidant at at least one of the front or back surface.

9. The pressed flower ornament according to claim 5, wherein the transparent plate is formed of one of a transparent glass and an acrylic material.

10. The pressed flower ornament according to claim 5, wherein said means for adhering also covers the surface where the pressed flower assortment is disposed so as to maintain the pressed flower assortment in place.

* * * * *